(12) United States Patent
Divisi

(10) Patent No.: US 10,704,733 B2
(45) Date of Patent: Jul. 7, 2020

(54) PUMP PROVIDED WITH A RESERVOIR OF A LUBRICANT

(71) Applicant: DROPSA S.p.A., Milan (IT)

(72) Inventor: Walter Divisi, Monaco (MC)

(73) Assignee: DROPSA S.P.A., Milan (IT)

( * ) Notice: Subject to any disclaimer, the term of this patent is extended or adjusted under 35 U.S.C. 154(b) by 137 days.

(21) Appl. No.: 15/661,674

(22) Filed: Jul. 27, 2017

(65) Prior Publication Data

US 2018/0031179 A1 Feb. 1, 2018

(30) Foreign Application Priority Data

Jul. 29, 2016 (IT) ........................ 102016000080003

(51) Int. Cl.
| | |
|---|---|
| *F16N 13/02* | (2006.01) |
| *F16N 11/04* | (2006.01) |
| *F04B 23/02* | (2006.01) |
| *F04B 53/18* | (2006.01) |
| *F04B 53/12* | (2006.01) |
| *F16N 19/00* | (2006.01) |

(52) U.S. Cl.
CPC .............. *F16N 13/02* (2013.01); *F04B 23/02* (2013.01); *F04B 53/125* (2013.01); *F04B 53/18* (2013.01); *F16N 11/04* (2013.01); *F16N 19/00* (2013.01); *F16N 2260/02* (2013.01)

(58) Field of Classification Search
CPC .......... F16N 11/04; F16N 11/06; F16N 13/02; F16N 19/00; F16N 19/003; F16N 29/02; F04B 53/125; F04B 53/129
See application file for complete search history.

(56) References Cited

U.S. PATENT DOCUMENTS

| | | | | |
|---|---|---|---|---|
| 1,901,148 | A * | 3/1933 | Creveling | ................. F16N 3/12 184/105.2 |
| 2,050,686 | A * | 8/1936 | Wiggins | .................... F17B 1/08 220/216 |
| 4,951,848 | A * | 8/1990 | Keller | ............... B05C 17/00579 222/386 |
| 5,598,902 | A * | 2/1997 | Lin | ........................ F16N 11/04 137/454.5 |
| 5,878,922 | A * | 3/1999 | Boring | ............. B05C 17/00576 222/386 |
| 7,313,956 | B1 * | 1/2008 | Murphy, Sr. | ............ G01F 23/70 73/305 |

(Continued)

FOREIGN PATENT DOCUMENTS

| | | |
|---|---|---|
| DE | 3628335 A1 | 2/1988 |
| DE | 102011053027 A1 | 2/2013 |
| EP | 1914425 A2 | 4/2008 |

OTHER PUBLICATIONS

Search Report and Written Opinion dated Apr. 28, 2017 for Italian patent application No. 102016000080003.

*Primary Examiner* — Minh Truong

(74) *Attorney, Agent, or Firm* — Vorys, Sater, Seymour and Pease LLP

(57) ABSTRACT

A pump with a reservoir of a lubricant, including a hollow body in which a piston, loaded by a pressing element, sealingly slides, at least a port for loading the lubricant in a compartment defined by the inner wall of the hollow body and by the piston, and at least a valve for exhausting air trapped in the compartment together with the lubricant during a loading step.

17 Claims, 3 Drawing Sheets

(56) References Cited

U.S. PATENT DOCUMENTS

| | | | | |
|---|---|---|---|---|
| 9,458,966 B2* | 10/2016 | Holman | ............... | F04B 17/03 |
| 9,713,816 B2* | 7/2017 | Robert | ............... | B05B 12/149 |
| 2005/0029306 A1* | 2/2005 | Brennan | ........... | B05C 17/00576 |
| | | | | 222/327 |
| 2009/0229920 A1* | 9/2009 | Yang | ................ | F16N 11/04 |
| | | | | 184/7.4 |
| 2013/0256062 A1* | 10/2013 | Kotyk | .................. | F16K 21/18 |
| | | | | 184/36 |
| 2014/0060664 A1* | 3/2014 | Abbott | ................ | F04B 9/14 |
| | | | | 137/101.11 |
| 2018/0100620 A1* | 4/2018 | Holman | ............... | F16N 13/02 |

* cited by examiner

PUMP PROVIDED WITH A RESERVOIR OF A LUBRICANT

This claims the benefit of Italian patent application no. 102016000080003, filed Jul. 29, 2016.

FIELD OF THE INVENTION

The present invention relates to a pump provided with a reservoir of a lubricant, preferably semisolid.

In particular, it relates to a pump in which the lubricant is grease, fluid grease or other types of lubricant preferably with a viscosity similar to that of grease.

PRIOR ART

In the field of lubrication, pumps are often used which are provided with a plurality of pumping elements that are interchangeable and/or selectable according to the pumping volume required, actuated by one or more cams. These pumping elements are very simple and, in use, they directly draw from a grease reservoir that can be in direct communication with the same compartment where the cams are housed, suitably driven by a motor. An example of a pump such as those described is the subject of document EP1914425-A2, which is incorporated herein by reference.

Lubricant reservoirs, for example that of the pump of the patent document mentioned above, involve various problems in the filling step (especially the first filling), which make these operations long and difficult.

SUMMARY OF THE INVENTION

The object of the present invention is to provide a pump provided with a reservoir that is easier and faster to fill or refill.

This and other objects are achieved by a pump provided with a reservoir of a lubricant implemented according to the technical teachings of the appended claims.

BRIEF DESCRIPTION OF THE FIGURES

Further features and advantages of the invention will become apparent from the description of a preferred but non-exclusive embodiment of the pump, shown by way of a non-limiting example in the accompanying drawings, in which.

DETAILED DESCRIPTION OF THE INVENTION

Figure 1:
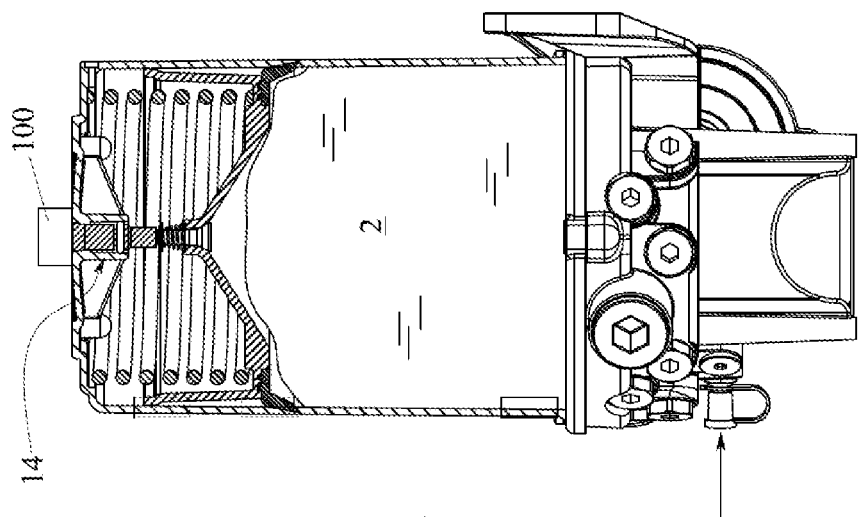
FIGS. 1 to 5 show a pump reservoir according to the present invention during various filling steps.
Figure 2:
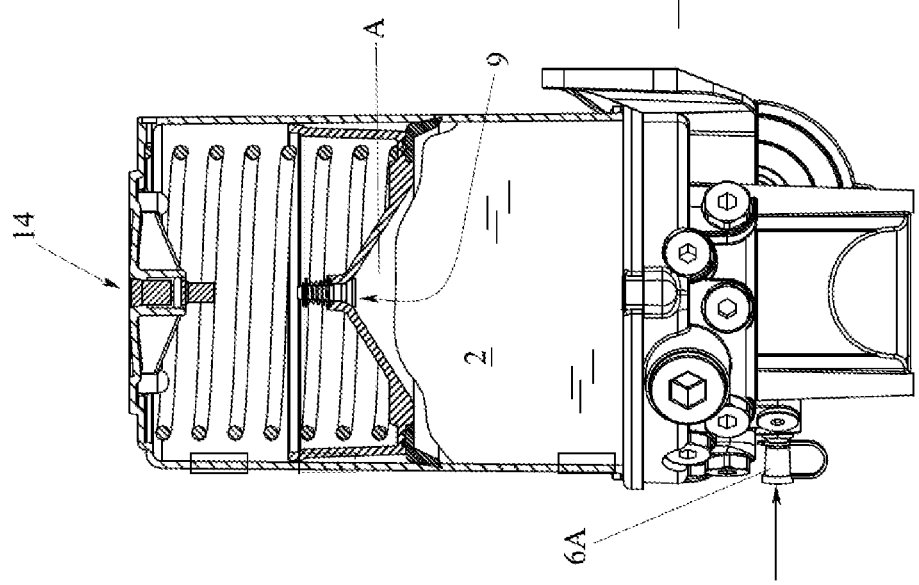

With reference to the above figures, a pump provided with a reservoir of a lubricant is shown, indicated as a whole with reference numeral 1.

The pump in which reservoir 1 is integrated may be provided with multiple pumping elements, advantageously of the modular type, adapted to distribute the content of the reservoir among one or more utilities.

Figure 7:
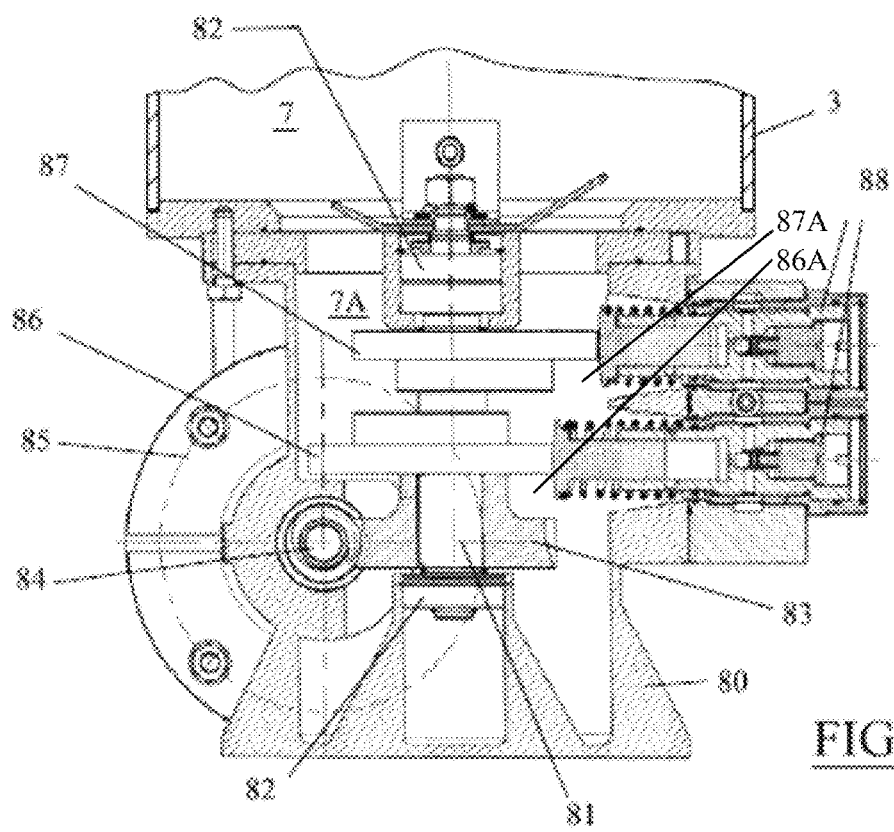
FIG. 7 is a simplified sectional view of a pump which can be associated with the reservoir in FIG. 1.

A particularly advantageous use is found in a pump like the one shown in a very schematic manner in FIG. 7.

It comprises a casing 80 which defines a space 7A where the various components of the pump are mounted. The space 7A is in direct communication with a compartment 7 of reservoir 1. Specifically, the space 7A opens towards the compartment 7. In this way, the contents of the reservoir 7 fills the space 7A defined by the casing 80.

Within the casing a shaft 81 (in the example with a vertical axis) is mounted on suitable bearings 82. The shaft is set in rotation, for example, by means of a pinion 83 keyed to the shaft itself and meshed with a worm screw 84 driven in rotation by a suitable reduction motor 85.

At least one cam 86 is mounted on the shaft 81 (two cams 86 and 87 are provided in the example, but their number can be any depending on the requirements). The cams 86 and 87 have an eccentric outer profile 86A and 87A with respect to the axis of the shaft 81, so as to be able to actuate the pumping elements 88 cooperating with each profile.

Advantageously, the pumping elements 88 are independent pumping cartridges, easily replaceable, and may also be provided with different pumping volumes. Therefore, depending on the requirements, it is possible to select a pumping element with a greater or smaller volume, which, however, is mounted on the same pump, to the full advantage of the flexibility of configuration.

According to a particularly advantageous variant of the pump, the cams 86 or 87 are made of different materials, depending on the load that they will need to transfer to the pumping elements.

For example, it is possible to provide a plastic material cam (e.g. made of PE) to which pumping elements will be associated that work at relatively low pressures, and a metal cam (e.g. made of steel) to which pumping elements 88 will be associated, which operate at higher pressures, and thus urge the cam in a more heavy manner. In this way, it is possible to obtain an advantage in terms of the production cost of the pump itself, since precious and expensive materials will be used only when actually needed.

Again with regards to the cams, it is noted that they may be installed so as to load the shaft 81 to bending, in a balanced manner. Thus, for example, when the cam 87 will operate on a pumping element in compression, the cam 86 will operate on a pumping element arranged in a plane containing the axis of the shaft 81, in 'release' and thus in suction.

Of course, the one described is only one of the possible configurations of the pump which may be associated with the reservoir in question.

As already mentioned, the reservoir 1 is configured to contain a lubricant preferably semisolid, such as grease or fluid grease (or other grease-like viscosity lubricant) and comprises a hollow body 3 in which a piston 4, loaded by a pressing element 5, sealingly slides. The pressing element 5 may be a spring, a pneumatic element, a weight, or any element capable of pressing the piston towards the pumping elements of the pump.

The inner wall of the hollow body 3, the piston 4 and a bottom of the hollow body, which in this case corresponds to the interior of the pump casing, define a compartment 7, intended to contain the lubricant. The compartment 7 is associated with at least one loading port 6 of the semisolid lubricant that is in communication with a port 6A that opens to the outside of the pump.

The reservoir is provided with at least one valve 9 for exhausting air trapped in said compartment 7 together with the semisolid lubricant during a loading step. The valve 9 is configured for an automatic opening, with the movement of said piston 4.

In particular, the valve 9 may be placed on the piston 4 itself. The piston may have a dome-shaped surface and said valve 9 can be located at the top of said dome-shaped surface of the piston 4.

In the embodiment shown, it is noted that the valve 9 opens on a surface of the piston opposed with respect to said compartment 7 for containing semisolid lubricant. In this way, when some lubricant is discharged together with the air, it is distributed on the outer surface of the piston and lubricates a seal 4A of the piston itself.

Coming to a detailed description of the valve 9, it is noted that an actuating shaft 10 is present, the shaft 10 cooperating, during the opening of the valve, with a part of the reservoir. Specifically, when the shaft 10 of the valve abuts on a part of the reservoir provided for this purpose, a head 10A of the valve is pushed towards the compartment 7, thereby freeing an air vent passage (arrow P) that may be present below the dome of the piston 4.

In one example, the hollow body 3 of the reservoir may have a cover 3A provided with a signalling element 14 movable between a first and a second end of stroke position, and actuated by the movement of said piston 4 (and specifically right by the shaft 10 of the valve 9), in a longitudinal direction along a longitudinal axis "L", at least when the piston 4 reaches a position related to a maximum load volume of the lubricant.

In the described embodiment, the signalling element 14 allows a manual opening of the valve 9, when it is in contact with the shaft 10 and in a position between the first and second end of stroke position of the signalling element 14. This opening method of the valve 9 will be clarified hereinafter.

In the described embodiment, the valve 9 is made in a very simple manner. A spring 11 is fitted on the shaft 10, which has a mushroom-shaped end portion 10A arranged into the compartment 7, to which a seal 10B is associated. The spring is interposed between an abutment surface 12 of the piston 4 and a stop 13 of the shaft 10 itself (for example an elastic ring fitted in a shaft groove), so that said spring 10 brings said valve 9 in a stable sealingly closing position (i.e. with the head 10A which abuts the inside of the piston).

Figure 3:
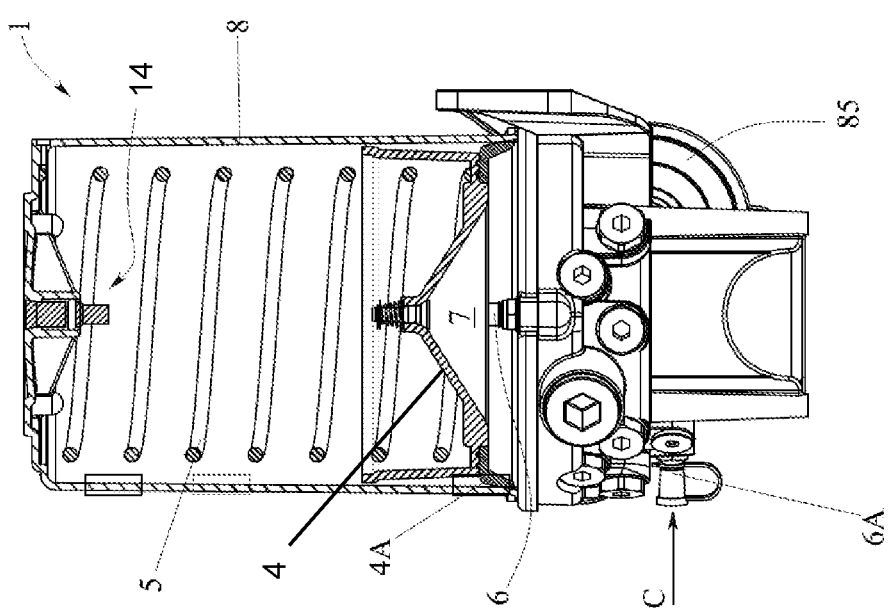
Figure 4:
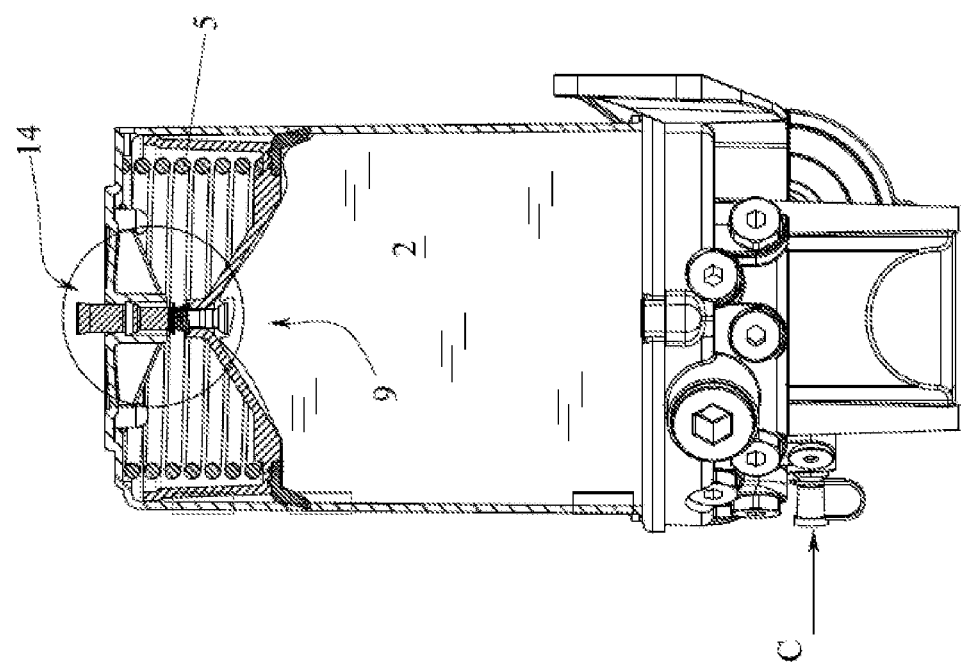
Figure 5:
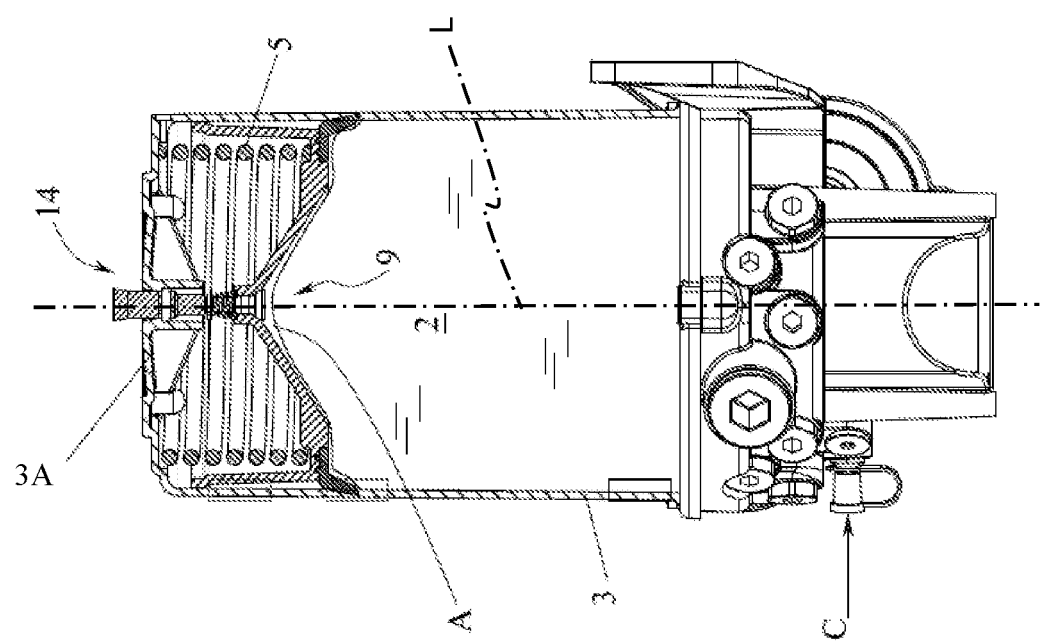

According to a variant, only hinted at in FIG. 3, the signalling element 14 may be coupled to an electrical component (such as a motion detector 100) adapted to generate a signal processable by a control unit (such as of the lubricant loading pump) when the signalling element is moved. In this way, it is possible to proceed with an automatic filling of the reservoir 1.

The operation of the reservoir described above is apparent from the combined analysis of FIGS. 1 to 5.

In a first step, the reservoir is empty (FIG. 1). In this step, the lubricant which will fill the reservoir 1 is injected or pumped into the loading port 6A (arrow C). The lubricant reaches the compartment 7 through the loading port 6 and, as it fills the compartment 7 (and the space 7A, if present), the pressure raises the piston 4.

Of course, between the piston 4 and the free surface of the lubricant, an air cushion A is trapped, which prevents the lubricant 2 from lying onto the surface of the piston 4 within the compartment 7. As the lubricant is injected (or pumped), the piston raises increasingly more, until the shaft 10 of the valve 9 comes into contact with the signalling element 14 (FIG. 3).

Figure 6:
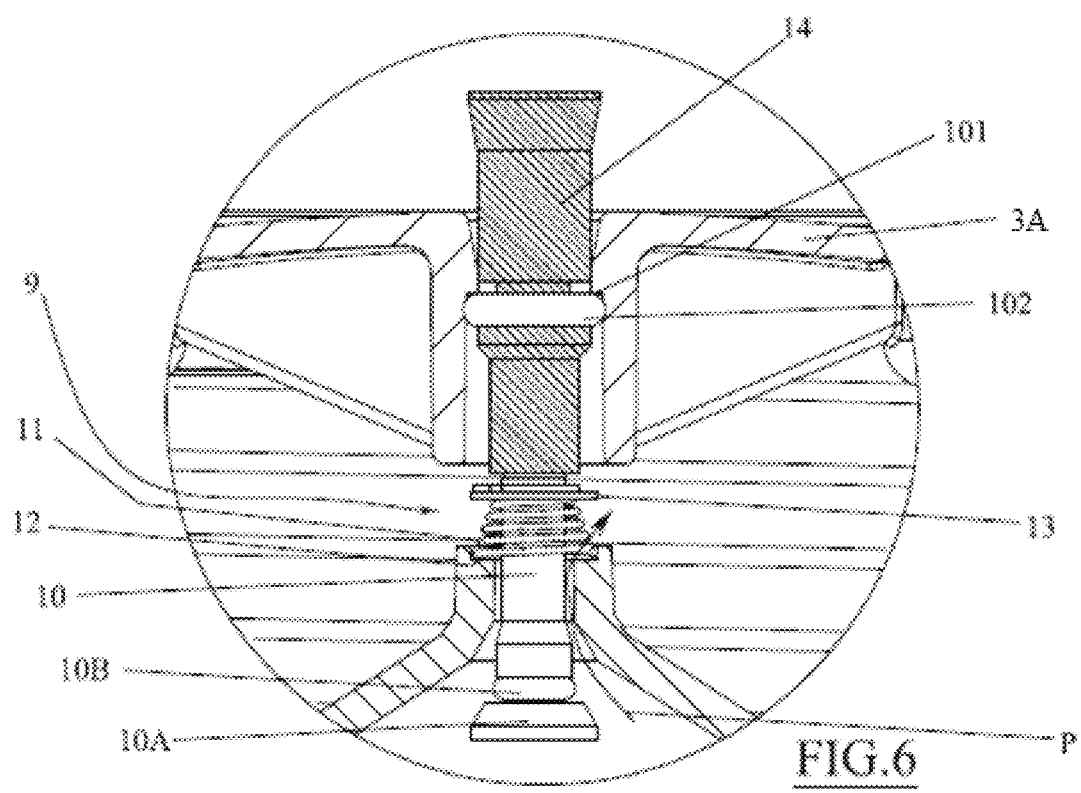
FIG. 6 is an enlarged and out-of-scale view of the part enclosed in the circle in FIG. 5.

A further movement of the piston raises the signalling element that begins to protrude from the outer surface of the cover 3A, thus signalling the approach of the piston to a fully loaded configuration of the reservoir 1. In this step, the signalling element 14 is located in an intermediate position between a first end of stroke (in which the shaft 10 of the valve is distant from the signalling element) and a second end of stroke in which a step 101 of the cover 3A abuts on a protrusion (for example, a seal 102) of the signalling element (FIG. 6). FIG. 6 also shows longitudinal axis "L".

When it is in this intermediate position, an external pressure exerted on the signalling element is transmitted to the valve 9, which consequently opens, thus venting part of the air trapped between the top of the piston 4 and the free surface of the lubricant 2.

In the absence of a manual intervention on the signalling element 14, the stroke of the signalling element continues until it reaches the second end of stroke (FIG. 6).

A further movement of the piston towards the signalling element causes the opening of the valve 9, allowing an automatic venting of the air trapped above the lubricant.

In this configuration, a subsequent introduction of lubricant into the compartment 7 does not cause a consequent movement of the piston 4 (which has already reached its maximum load position), and the excess lubricant automatically vents from the valve 9, above the outer surface of the piston 4 (in the part where the spring 5 that presses the piston is housed).

Therefore, the valve 9, in addition to the venting function of the air trapped above the grease, also acts as an overflow valve, in a loading step of the lubricant in the reservoir.

In fact, as it may be seen in FIG. 6, when the valve 9 is in an open position, the passage P is configured not only to allow the air vent, but also to allow a passage (expulsion) of the lubricant outside the compartment 7. This may prevent the compartment and the pump to break in case of an over-loading of the lubricant which is pumped in the compartment 7 during a loading phase, under pressure.

Various embodiments of the invention have been described but others may be conceived using the same innovative concept.

The invention claimed is:

1. A pump with a reservoir of a lubricant, comprising:
   a base providing a base surface,
   a hollow body on the base surface, wherein the hollow body has an inner side wall and a cover,
   a piston within the hollow body, wherein the piston has a piston perimeter seal attached to a perimeter of the piston and arranged around the perimeter of the piston, wherein the piston fully supports the piston perimeter seal, wherein the piston has opposed first and second surfaces,
   wherein the hollow body inner side wall, the cover and the piston first surface define a space within the hollow body;
   a pressing element, wherein said pressing element comprises a spring positioned on the piston, the pressing element in contact with an inner surface of the cover and the piston first surface, the pressing element biased to push the piston away from the inner surface of the cover, wherein the piston first surface is dome shaped;
   wherein the piston perimeter seal has a piston seal outer perimeter edge that slidingly contacts the inner side wall of the hollow body so that the piston, loaded by the pressing element, is sealingly slideable within the hollow body,
   a loading port through the base surface for filling the lubricant into a compartment defined by at least the base surface, the inner side wall of the hollow body, and the second surface of the piston, and a valve for exhausting air trapped in the compartment together with the lubricant during a filling step of filling the lubricant into the compartment, the valve being also configured to act as an overflow valve during the filling step of filling the lubricant into the compartment, the valve having an actuating shaft which is reciprocally longitudinally slideable between an open position, for the exhausting of air, and a closed position, wherein the valve is located on the piston, wherein the valve is biased to be in the closed position during the filling step;

wherein said valve actuating shaft cooperates, during opening of the valve, with a part of the pump opposed to the piston, to longitudinally move from the closed position to the open position;

wherein said hollow body cover provides the part of the pump that cooperates, during opening of the valve, with the actuating shaft;

wherein the piston is moveable away from the base surface towards the cover with the valve in the closed position during the filling;

wherein the valve is moveable from the closed position to the open position while the piston approaches the cover while said valve actuating shaft cooperates, during opening of the valve, with the part of the pump opposed to the piston, to longitudinally move from the closed position to the open position;

wherein the compartment is adapted and configured such that, during the filling step of filling the lubricant into the compartment, the piston is between the cover and the base surface.

2. The pump according to claim 1, wherein said reservoir is integrated in the pump.

3. The pump according to claim 2, wherein said valve is located at the top of said dome-shaped surface, wherein said piston has said dome-shaped surface when the reservoir is empty, when the valve is in the open position, and when the valve is in the closed position.

4. The pump according to claim 1, wherein the valve is automatically opened by at least a movement of said piston.

5. The pump according to claim 1, wherein said valve discharges on the first surface of the piston opposed with respect to said compartment for containing the lubricant.

6. The pump according to claim 1, wherein said reservoir opens directly to a casing of the pump.

7. The pump according to claim 1, wherein the hollow body has the cover provided with a signaling element movable between a first end of stroke position and a second end of stroke position, and actuated by the movement of said piston at least when the piston reaches a position of a maximum load volume of the lubricant.

8. The pump according to claim 7, wherein the signaling element is actuated by the actuating shaft of the valve, the signaling element allowing a manual opening of the valve when the signaling element is in contact with the actuating shaft and the signaling element is between the first and the second end of stroke position.

9. The pump according to claim 8, wherein the signaling element comprises an indicator shaft actuated by the actuating shaft of the valve, wherein the signaling element is moveable with the reciprocal longitudinal motion when the indicator shaft is in contact with the actuating shaft.

10. The pump according to claim 7, wherein the signaling element is coupled to an electrical component configured to generate a signal that can be processed by a control unit when the signaling element is moved.

11. The pump according to claim 7, wherein the signaling element comprises an indicator shaft actuated by the actuating shaft of the valve, wherein the signaling element is moveable with the reciprocal longitudinal motion when the indicator shaft is in contact with the actuating shaft.

12. The pump according to claim 1, wherein a spring is fitted on the actuating shaft, interposed between an abutment surface of the piston and a stop of the actuating shaft itself, in such a way that said spring brings said valve in a stable sealingly closing position.

13. The pump according to claim 1, wherein the valve is adapted and configured for exhausting, to a plenum of the hollow body, air trapped in the compartment together with the lubricant during the filling step of filling the lubricant into the compartment.

14. The pump according to claim 1, wherein the pump has a casing defining a pump space wherein is contained a rotatable shaft, wherein the reservoir compartment is in direct communication with the pump space for opening directly to the casing of the pump to fill the pump space defined by the casing.

15. The pump according to claim 1, wherein a pump space is positioned below the reservoir.

16. A pump with a reservoir of a lubricant, comprising:
a hollow body,
a piston within the hollow body, wherein the piston has a piston seal attached to a perimeter of the piston and arranged around the perimeter of the piston, wherein the piston fully supports the piston perimeter seal,
a pressing element,
wherein the piston seal has a piston seal outer perimeter edge that slidingly contacts inner side wall of the hollow body so that the piston, loaded by the pressing element, is sealingly slideable within the hollow body,
at least a loading port for feeding the lubricant in a compartment defined by at least the inner side wall of the hollow body and by at least said piston, and
at least a valve for exhausting air trapped in said compartment together with the lubricant during a loading step of loading the lubricant into the compartment, the valve being also configured to act as an overflow valve during the loading step of loading the lubricant in the compartment, the valve having an actuating shaft which is reciprocally longitudinally slideable between an open position, for the exhausting of air, and a closed position, wherein said valve is located on said piston;
wherein said valve actuating shaft cooperates, during opening of the valve, with a part of the pump opposed to the piston, to longitudinally move from the closed position to the open position;
wherein, during the loading step of loading the lubricant, the compartment is at least partially defined by the inner wall and the piston as lubricant enters the compartment;

wherein the hollow body has a cover provided with a signaling element movable between a first end of stroke position and a second end of stroke position, and actuated by the movement of said piston at least when the piston reaches a position of a maximum load volume of the lubricant,
wherein the signaling element comprises an indicator shaft actuated by the actuating shaft of the valve, wherein the signaling element is moveable with the reciprocal longitudinal motion when the indicator shaft is in contact with the actuating shaft,
wherein the indicator shaft is longitudinally reciprocally moveable within a passageway of the hollow body cover and the indicator shaft comprises an indicator shaft perimeter seal for sealing an annular space between the indicator shaft and walls of the passageway of the hollow body cover.

17. The pump according to claim 16, wherein said pressing element comprises a spring positioned on the piston, said spring contacting a cover of the hollow body opposed to the piston when said valve is in the open position.

* * * * *